(No Model.)
J. BERNADAC.
HOOF TRIMMING DEVICE.
No. 343,427. Patented June 8, 1886.
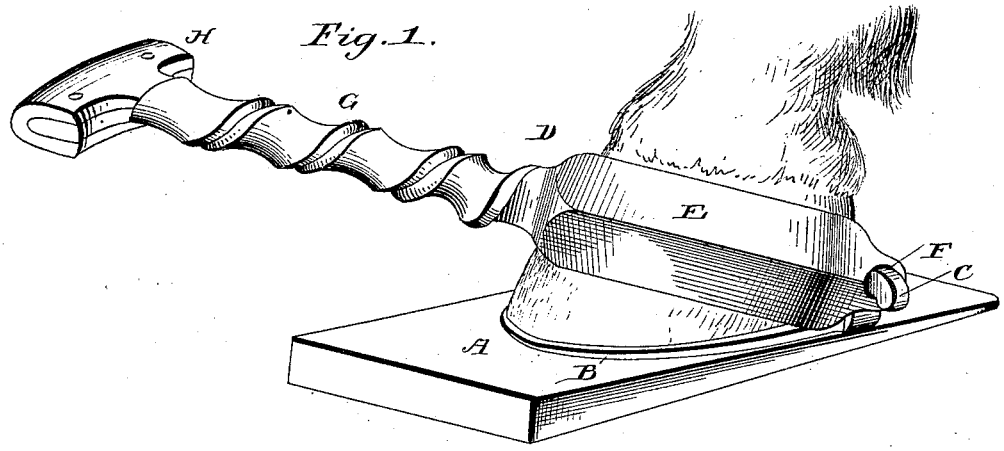
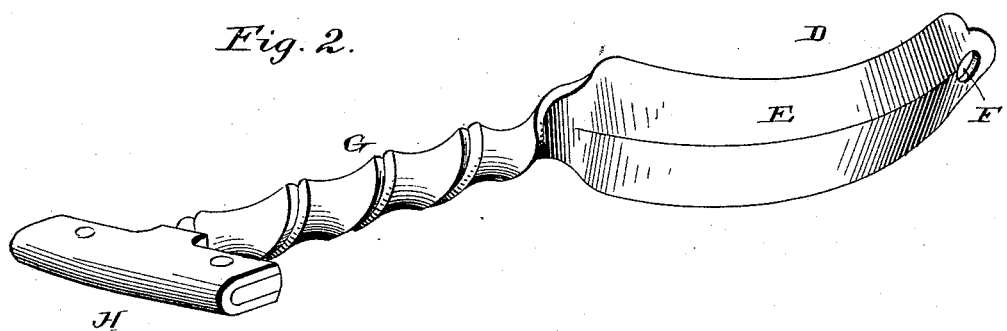
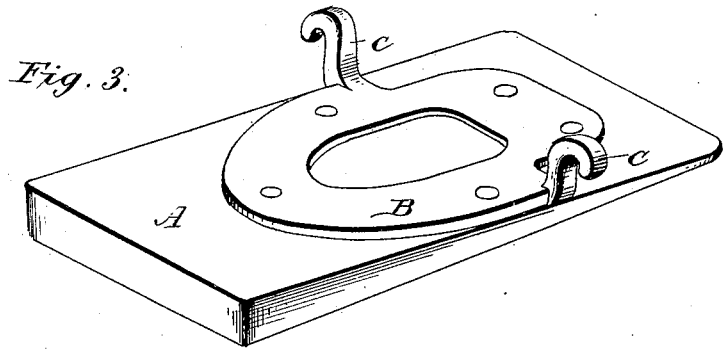
WITNESSES
Jean Bernadac,
INVENTOR
By Louis Bagger & Co.
Attorneys.

UNITED STATES PATENT OFFICE.

JEAN BERNADAC, OF NEW IBERIA, LOUISIANA.

HOOF-TRIMMING DEVICE.

SPECIFICATION forming part of Letters Patent No. 343,427, dated June 8, 1886.

Application filed December 4, 1885. Serial No. 184,716. (No model.)

*To all whom it may concern:*

Be it known that I, JEAN BERNADAC, a citizen of the United States, and a resident of New Iberia, in the county of Iberia and State of Louisiana, have invented certain new and useful Improvements in Hoof-Trimming Devices; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view showing my improved hoof-trimming device applied to the hoof of a horse. Fig. 2 is a similar view of the cutter, and Fig. 3 is a perspective view of the base of the device.

Similar letters of reference indicate corresponding parts in all the figures.

My invention has relation to devices for trimming the outside of the hoof of a horse; and it consists in the improved construction and combination of parts of such an apparatus, in which the outside of a horse's hoof may be easily and accurately trimmed, as hereinafter more fully described and claimed.

In the accompanying drawings, the letter A indicates a board, which is preferably slightly wedge-shaped, the forward edge being thicker than the rear edge, and which board is adapted to rest upon the thigh and knee of the horseshoer when in use. The upper side of this board is provided with a metallic frame or plate, B, preferably of iron, which plate is shaped corresponding to the contour of a horse's hoof, the rim, however, being of sufficient width to allow hoofs of different sizes to rest with their rims upon the rim of the frame, and near the rear ends of the sides of this frame the frame is formed with two upwardly-projecting and outwardly-pointing hooks, C C, preferably integral with the frame and of considerable strength.

D is a cutter, consisting of a curved flat blade, E, having both edges sharpened and having its inner end formed into an eye, F, which may fit upon either of the two hooks, while the outer end of the blade is formed into a long and strong handle, G, provided with a cross-handle, H, at its end, which may be grasped by the hand. The long handle is for the sake of giving it greater strength twisted spirally while the metal was hot, and the cross-handle is in a plane at right angles to the curved plane of the cutting-blade.

It will now be seen that as the hoof is placed upon the base-plate, which is kept upon the knee and thigh of the shoer, the rim of the hoof will rest upon the rim of the frame upon the base, and the eye of the cutter may be hooked upon one of the hooks, when, after grasping the cross-handle of the cutter, the edge of the cutter-blade may be brought against the outside of the hoof and the said outside trimmed off as desired, the curve of the blade allowing a large area of the horn to be trimmed at once, and the handle giving sufficient leverage to the cutter to cause the cutter-blade to make a clear cut. In this manner all superfluous horn may be cut off around the edge of the hoof without resorting to the method so much in use and so injurious to the foot of the horse—viz., the trimming of the rim of the hoof by means of a heavy knife placed with its edge against the hoof and forced through the horn by striking the back of the knife with a hammer, the said method jarring the foot and not only rendering the horse restless, but also loosening the horn and causing internal bruises, which may render the horse unfit for use. This device will avoid this injury and enable the operator to shave just sufficiently off from the edge of the horse's hoof as would have been worn off had the horse been without shoes, without jarring the horn of the foot, and allowing small quantities of horn to be removed, the leverage obtained for the cutter-blade admitting of greater accuracy in trimming the horn than can be accomplished with a knife forced through the horn by a hammer.

Having thus described my invention, I claim and desire to secure by Letters Patent of the United States—

1. In a device for trimming hoofs, the combination, with a base-plate having outwardly-pointing hooks at its side edges, with a curved cutter-blade having both edges sharpened, and having an eye at its inner end and a lever-handle at its outer end, as and for the purpose shown and set forth.

2. In a device for trimming hoofs, the combination of a wedge-shaped base-plate, a frame shaped to correspond to the shape of a hoof, and secured upon the base-plate and provided with upwardly-projecting outwardly-pointing hooks at its sides near its rear end, and a curved cutter-blade having both edges sharpened and formed with an eye for engaging the hooks at its inner end, and with a lever at its outer end having a cross-handle, as and for the purpose shown and set forth.

In testimony that I claim the foregoing as my own I have hereunto affixed my signature in presence of two witnesses.

JEAN BERNADAC.

Witnesses:
WM. R. BURKE,
P. L. RENOUDET.